Jan. 24, 1928.

H. COLLIER 1,657,069

BRAKING MECHANISM

Filed Oct. 30. 1926

Harry Collier,
INVENTOR.
BY
ATTORNEY.

Jan. 24, 1928.
H. COLLIER
BRAKING MECHANISM
Filed Oct. 30, 1926
1,657,069
3 Sheets-Sheet 2
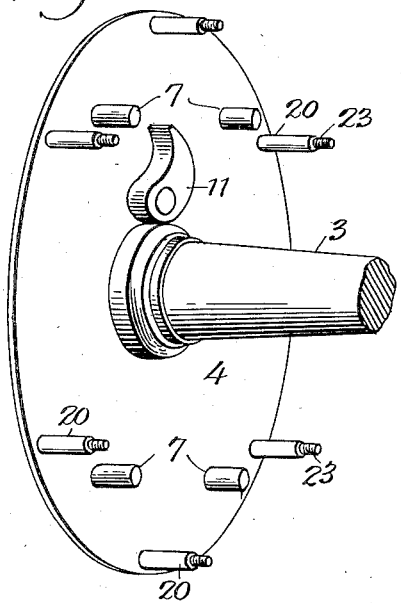
Fig. 2.
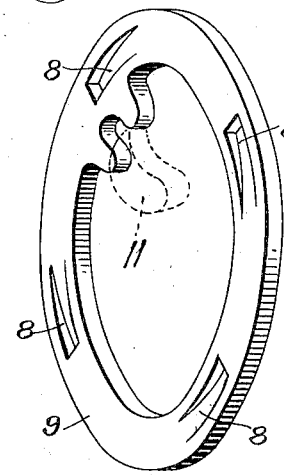
Fig. 3.
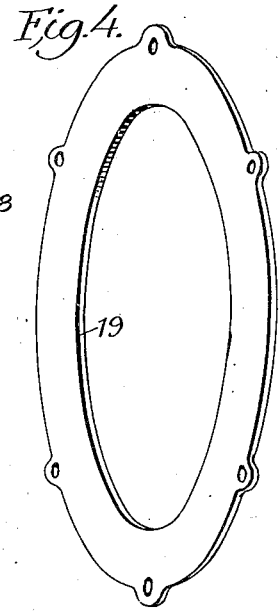
Fig. 4.
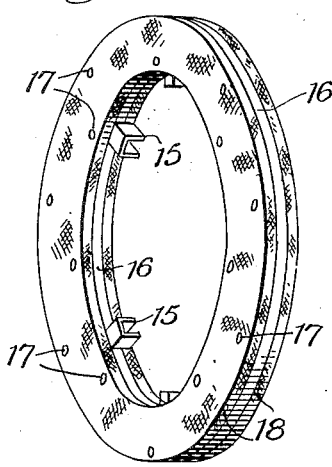
Fig. 5.
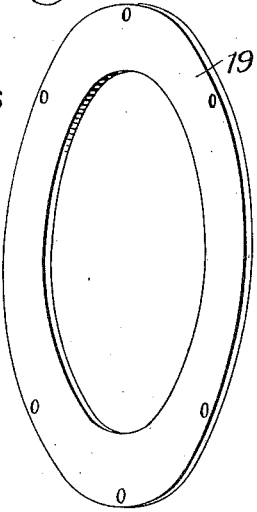
Fig. 6.
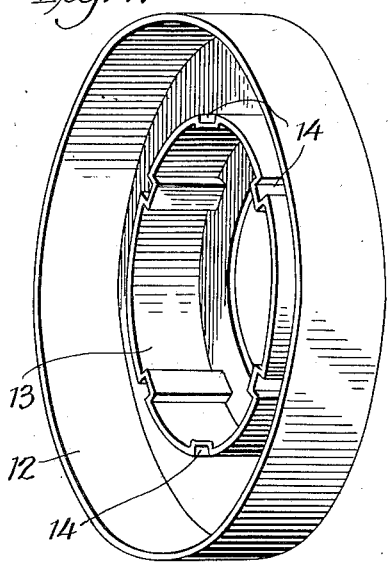
Fig. 7.
Harry Collier,
INVENTOR.
BY
ATTORNEY.

Jan. 24, 1928.

H. COLLIER 1,657,069

BRAKING MECHANISM

Filed Oct. 30. 1926

Harry Collier,
INVENTOR.

BY
ATTORNEY.

Patented Jan. 24, 1928.

1,657,069

UNITED STATES PATENT OFFICE.

HARRY COLLIER, OF PARIS, ILLINOIS.

BRAKING MECHANISM.

Application filed October 30, 1926. Serial No. 145,181.

My invention relates to improvements in braking mechanism and refers particularly to a multiple disk braking mechanism particularly designed for employment upon automobiles or motor vehicles, although not limited in its use.

One object of my invention is the provision of a braking mechanism of the character named which will be small and compact in size to occupy a small space and not prove unsightly or detract from the appearance of the vehicle upon which it is used.

Another object of my invention is the provision of a braking mechanism which can be operated instantly with very small effort or labor to apply the brake in the most effective and practical manner without much wear or strain upon the parts which comprise the mechanism.

Another object of my invention is the provision of a braking mechanism which will comprise few parts insuring simplicity, durability and inexpensiveness of production and which in all important respects will prove desirable, efficient and thoroughly practical.

To attain the desired objects my invention consists of a braking mechanism embodying novel features of construction and combination of parts for service, substantially as described and claimed, and as illustrated in the accompanying drawings, in which:

Fig. 2 represents a perspective view of the dust cap, axle, lever operated cam, connecting studs, and cam ring operating pins.

Fig. 3 represents a perspective view of the cam ring looking at its inner or cam way face.

Fig. 4 represents a perspective view of one of the brake or impinging rings.

Fig. 5 represents a perspective view of the multiple disk movable friction brake member of my invention.

Fig. 6 represents a perspective view of the other or twin brake or impinging ring.

Fig. 7 represents a perspective view of the cover which is attached to and revolves with the wheel, and the ring secured thereto and provided with guides for the multiple friction brake member.

Referring by numeral to the drawings in which similar numbers of reference are used to denote the same parts in all the views:

Figure 1:
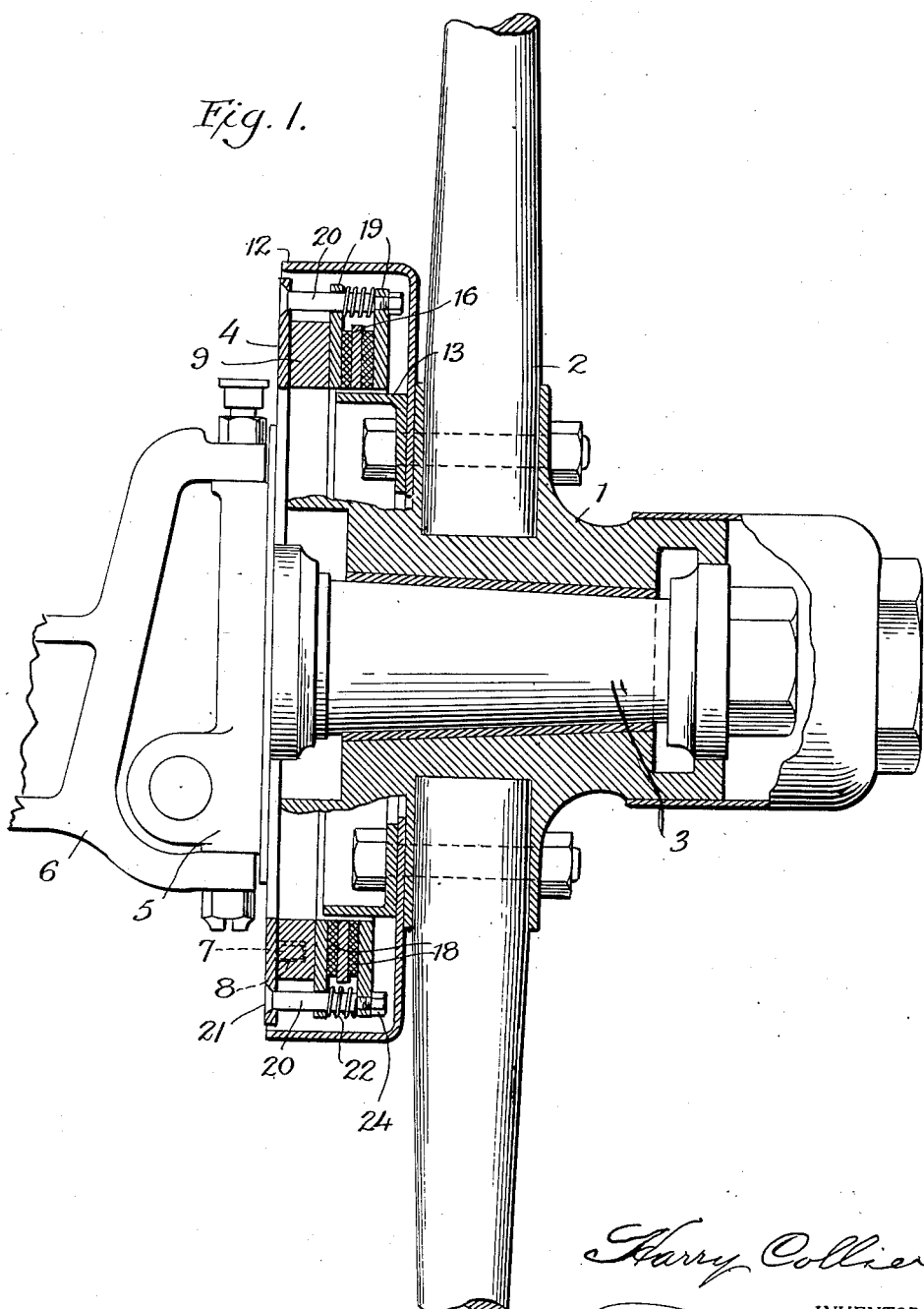
Figure 1 represents a view partly in elevation and partly in section of an automobile multiple disk braking mechanism constructed in accordance with and embodying my invention.
Figure 8:
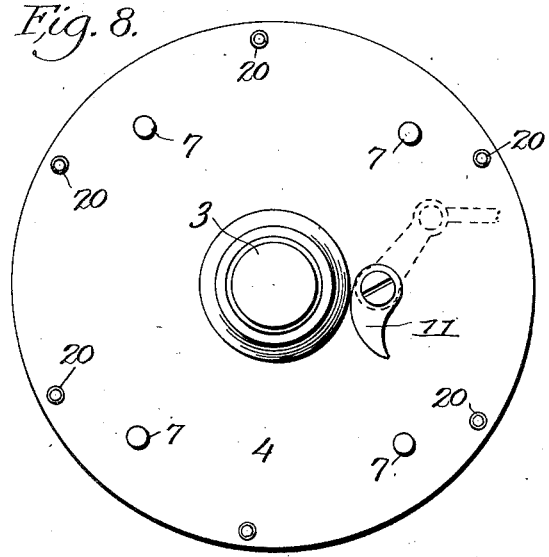
Fig. 8 represents a face or plan view of the dust cap.
Figure 10:
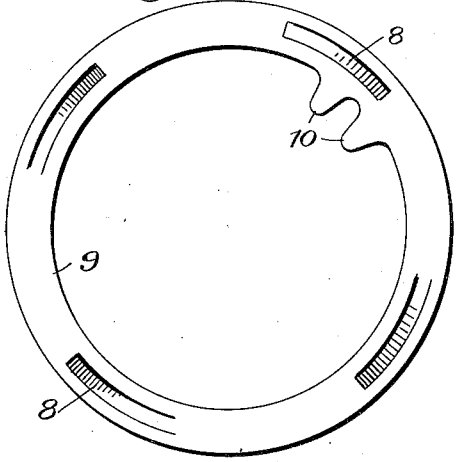
Fig. 10 represents a plan or face view of the cam ring.
Figure 9:
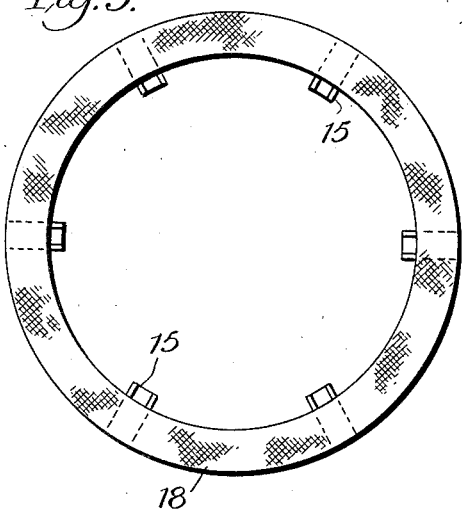
Fig. 9 represents a face or plan view of the friction ring or brake member.
Figure 11:
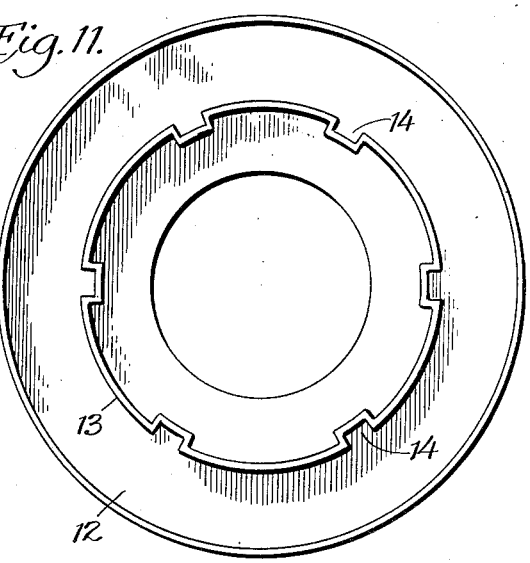
Fig. 11 represents a plan or face view of the cover and ring carried thereby having the guides to receive the lugs of the said friction member.

The numeral 1 designates the hub, 2 the spokes fitted to said hub, 3 the axle, 4 the dust cap, and 5 the pivotal connection with the axle bar or connection 6, all of which parts are of well known construction.

The dust cap is stationary and is provided with a series of projections or pins 7, adapted to move in the inclined cams or ways 8, of the cam ring 9, said cam ring being formed with a forked portion 10, with which is adapted to engage the pivoted manually controlled lever cam 11, the action of which causes the pins 7 to ride in the cam ways 8 and impart an outward movement to said cam ring, as will presently more fully appear.

Secured to hub 3 is the cupped cover 12, in which is concentrically secured the flanged ring 13, which ring is provided with the series of vertical guides 14, which receive the lugs 15, carried by the plate 16, which is secured by fastening 17, between the pair of friction disks 18, thus the pair of friction disks forms the multiple friction braking member of my invention and revolves with the wheel and the cover, but is permitted a slight movement horizontally, the effect of which is under the movement of the cam ring to cause the faces of said disks 18, to impinge or bear against the inner faces of the pair of rings 19, effecting the braking action through the medium of said pair of steel rings, which are stationary and secured in twin relation by means of the series of bolts 20, which have their heads 21, secured to the dust cap, have the spring cushions 22, mounted thereon between the twin rings and have their outer threaded ends 23, receiving the securing nuts 24.

It will be apparent that the projection on the cam ring is normally in engagement with the lever cam and that manual operation of the lever cam partially rotates said cam ring causing the studs or projections 7 to ride in the cam ways 8 to effect a lateral movement and cause the braking action of my mechanism, and that movement of the lever cam in the reverse direction releases the braking action.

From the foregoing description taken in connection with the drawings the operation of my braking mechanism will be readily understood and it will be apparent that the wheel, cover and friction member revolve, while the dust cap and twin steel friction member engaging rings are stationary and that manual movement of the lever cam moves the cam ring and causes the friction member to be moved to braking contact with the twin steel friction rings effecting an instant braking on the wheel with the expenditure of very little effort.

The many advantages of my braking mechanism will be readily understood and appreciated by all persons acquainted with such mechanism, and its simplicity, durability and cheapness, its ease of operation and repair, its compact construction and generally it will commend itself as thoroughly efficient and practical.

I claim:

1. In a braking mechanism of the character described, the combination with the hub, wheel, dust cap and axle, a friction member rotatable with the wheel and having a horizontal movement in relation thereto, a cam ring carried by the dust cap, a manually operated lever cam for partially rotating said cam ring, for moving said friction member, and stationary friction plates against which said friction member is adapted to bear in effecting the braking action.

2. In a braking mechanism of the character described, the combination with the hub, wheel, dust cap and axle, a cover carried by the wheel, a friction member stationary with reference to said cover and capable of being guided and retained by said cover, friction plates against which said friction member is adapted to bear, a cam ring carried by said dust cap for moving said friction member into contact with said friction plates, and a manually operated cam lever for moving said friction member, said cam lever being normally in engagement with said cam ring and being capable of a reciprocating movement to impart a partial rotation to said cam ring to operate the friction plates in connection with said friction member.

3. In a braking mechanism of the character described the combination with the hub, wheel, dust cap and axle, a manually operated pivoted cam lever connected to the dust cap, a cam ring having a forked portion adapted to be engaged by said cam lever, said pivoted cam lever when operated imparting a rotary movement to said cam ring, a series of cam ways in one face of said cam ring, a series of pins projecting from the dust cap and adapted to fit in said cam ways, a pair of steel friction rings secured in parallel relation to said dust cap, a multiple friction member disposed between said pair of friction rings and adapted to bear upon said rings, and means for guiding said friction member in a horizontal plane.

4. In a braking mechanism of the character described, the combination with the hub, wheel, dust cap and axle, a manually operated pivoted cam lever connected to the dust cap, a cam ring having a forked portion adapted to be engaged by said cam lever, said pivoted cam lever when operated imparting a rotary movement to said cam ring, a series of cam ways in one face of said cam ring, a series of pins projecting from the dust cap and adapted to fit in said cam ways, a pair of steel friction rings secured to and in parallel relation to said dust cap, cushion springs upon the securing means of said pair of friction rings, a multiple ring friction member disposed between said pair of friction rings, a ring disposed between and connected to said multiple rings of the friction member, lugs on said ring, a flanged plate secured to and rotatable with the cover, and ways on said flanged plate to receive and guide said lugs on the multiple friction member.

In testimony whereof I hereunto affix my signature.

HARRY COLLIER.